(12) United States Patent
Nelson (10) Patent No.: US 9,917,496 B2
(45) Date of Patent: Mar. 13, 2018

(54) LATCHING SECTOR MOTOR ACTUATOR AND FOR A FAILSAFE SECTOR MOTOR ACTUATOR HAVING AN AVAILABLE OPERATING RANGE NOT LIMITED TO 90°

(71) Applicant: Victor H. Nelson, Deer Park, NY (US)

(72) Inventor: Victor H. Nelson, Deer Park, NY (US)

( * ) Notice: Subject to any disclaimer, the term of this patent is extended or adjusted under 35 U.S.C. 154(b) by 570 days.

(21) Appl. No.: 14/479,423

(22) Filed: Sep. 8, 2014

(65) Prior Publication Data

US 2016/0072372 A1   Mar. 10, 2016

(51) Int. Cl.
| | |
|---|---|
| *H02K 33/00* | (2006.01) |
| *H02K 5/14* | (2006.01) |
| *H01F 7/00* | (2006.01) |
| *H02K 33/16* | (2006.01) |
| *H02K 33/10* | (2006.01) |

(52) U.S. Cl.
CPC ............ *H02K 33/16* (2013.01); *H02K 33/10* (2013.01)

(58) Field of Classification Search
CPC ................................. H02K 33/16; H02K 7/12
USPC ................ 310/15, 36–37, 40 R, 41; 335/272
See application file for complete search history.

(56) References Cited

U.S. PATENT DOCUMENTS

| | | |
|---|---|---|
| 3,543,202 A | 11/1970 | Naybor |
| 3,761,851 A | 9/1973 | Nelson |
| 3,886,545 A | 5/1975 | Skrobisch |
| 3,936,818 A | 2/1976 | Skrobisch |
| 3,970,980 A * | 7/1976 | Nelson ............... H02K 33/16 310/39 |
| 3,979,616 A * | 9/1976 | Stechmann ............ 310/154.11 |
| 4,227,164 A | 10/1980 | Kitahara |
| 4,523,167 A | 6/1985 | Remington |
| 4,795,929 A * | 1/1989 | Elgass ............... H01F 7/145 310/36 |
| 4,804,934 A * | 2/1989 | Finke ............... H01F 7/145 335/229 |
| 5,038,064 A | 8/1991 | Fiorenza |
| 5,287,835 A * | 2/1994 | Fiorenza, II ........... F02D 9/02 123/352 |
| 6,518,685 B2 | 2/2003 | Nelson |
| 6,967,422 B2 | 11/2005 | Nelson |
| 8,441,159 B2 | 5/2013 | Nelson |

(Continued)

FOREIGN PATENT DOCUMENTS

JP   61202410 A  * 9/1986 ......... H01F 41/0253

*Primary Examiner* — Jose Gonzalez Quinones
(74) *Attorney, Agent, or Firm* — Charles E. Baxley (57) ABSTRACT

In one embodiment, a latching sector motor actuator includes a housing, a permanent magnet, and a pole piece. The permanent magnet rotates relative to the housing. The pole piece has a polarity and a pair of wound wire coils, is fixedly attached to the housing, and communicates with the permanent magnet to cause the permanent magnet to rotate one of clockwise and counterclockwise, depending upon the polarity of the pole piece. In another embodiment, a failsafe sector motor actuator has a pole piece with a singularly wound wire coil and further includes an auxiliary permanent magnet. The auxiliary permanent magnet is adjustably attached to the housing to extend rotation of the permanent magnet from 80° to 120°, depending upon location and magnitude of the auxiliary permanent magnet.

14 Claims, 8 Drawing Sheets

(56) References Cited

U.S. PATENT DOCUMENTS

2008/0315691 A1* 12/2008 Jeung .................. H02K 1/2733
  310/51
2013/0328649 A1* 12/2013 Robertson ................. H01F 7/08
  335/234

* cited by examiner

LATCHING SECTOR MOTOR ACTUATOR AND FOR A FAILSAFE SECTOR MOTOR ACTUATOR HAVING AN AVAILABLE OPERATING RANGE NOT LIMITED TO 90°

1. BACKGROUND OF THE INVENTION

A. Field of the Invention

The embodiments of the present invention relate to an actuator, and more particularly, the embodiments of the present invention relate to a latching sector motor actuator and to a failsafe sector motor actuator having an available operating range not limited to 90°.

B. Description of the Prior Art

Conventional rotary solenoids are broadly classified into two categories, namely, one that converts axial motion produced by electromagnetic attraction into rotary motion by use of a mechanical transforming mechanism utilizing an inclined groove and a ball, and the other that directly rotates a rotor of soft magnetic material by way of an electromagnet.

Regardless of this difference, however, the conventional rotary solenoids are attracted or rotate only in a direction in which magnetic reluctance reduces because their moving members are made of soft magnetic material. Therefore, they require a return spring or other similar apparatus to bring them back to the original position when not in operation.

It is of course possible to constitute a bi-directionally rotating system by combining two solenoids of uni-directional torque type, disposed opposite to each other. In principle, however, this system does not differ from the uni-directional solenoid.

In addition, the angular range of rotation of the conventional rotary solenoids has been limited to approximately 90° because of their design concepts. Further, they have required continued energizing or provision of a lock mechanism to maintain the operating position.

Thus, there exists a need for a latching sector motor actuator and a failsafe sector motor actuator having an available operating range not limited to 90°.

Numerous innovations for actuators have been provided in the prior art, which will be described below in chronological order to show advancement in the art, and which are incorporated herein in their entirety by reference thereto. Even though these innovations may be suitable for the specific individual purposes to which they address, nevertheless, they differ from the embodiments of the present invention in that they do not teach a latching sector motor actuator and a failsafe sector motor actuator having an available operating range not limited to 90°.

(1) U.S. Pat. No. 3,543,202 to Naybor.

U.S. Pat. No. 3,543,202—issued to Naybor on Nov. 24, 1970 in U.S. class 335 and subclass 229—teaches an indicator mechanism that is responsive to short duration direct current pulses to discretely indicate the nature of the last pulse applied. The indicator is magnetically latched in position and maintains the last position achieved, irrespective of possible power failure.

(2) U.S. Pat. No. 3,761,851 to Instant Inventor Nelson.

U.S. Pat. No. 3,761,851—issued to instant inventor Nelson on Sep. 25, 1973 in U.S. class 335 and subclass 253—teaches a two-pole armature that is located between two field poles, which provides a direct motion rotary actuator with high starting torque. Latching, non-latching, fail-safe return motion, and torque are of few of the many of modes.

(3) U.S. Pat. No. 3,886,545 to Skrobisch.

U.S. Pat. No. 3,886,545—issued to Skrobisch on May 27, 1975 in U.S. class 340 and subclass 373 teaches a segmental readout device that includes a support plate carrying seven rotatable magnetized indicator members in a spaced array adjacent to a front plate having openings to expose the indicator members. A magnetic back plate has forwardly extending magnetic cores integrally formed with the back plate and carrying cylindrical electromagnetic coils for actuating the indicator members. One group of lateral magnets in the array has diametrically opposite poles oriented oppositely from similar poles of another group of centered magnets. Coils associated with the lateral magnets are oppositely wound from the coils associated with the centered magnets. Rotational axes of the lateral magnets are perpendicular to the axes of the centered magnets. The orientation of the axes and pole winding of the coils effectively isolate adjacent magnetic circuits from each other so that it limits the ability of one magnet to cause rotation of any other magnet.

(4) U.S. Pat. No. 3,936,818 to Skrobisch.

U.S. Pat. No. 3,936,818—issued to Skrobisch on Feb. 3, 1976 in U.S. class 340 and subclass 373—teaches an electromagnetic indicator assembly that includes a nonmagnetic angle plate defining a support frame for axially parallel spaced rotors, each including a permanent magnet and a nonmagnetic plate circumferentially surrounding a portion of the magnet. The rotors carry symbols for display at window openings in the support frame. Another angle plate made of magnetic metal has stamped laterally spaced integral fingers defining magnetic cores carrying magnetizing coils axially perpendicular to the rotors. Ends of the cores serve as abutments for spaced edges of the rotor plates to stop rotation thereof. Adjacent cores are oppositely magnetized and adjacent rotors are oppositely magnetized to prevent rotation of adjacent rotors when any one rotor is selectively turned to display a symbol. The coils are energizable to hold the rotors latched against rotation in both stationary positions or energizable only for the purpose of turning a rotor to display a symbol, with the rotor returning to an original stationary position magnetically when the coil is de-energized.

(5) U.S. Pat. No. 3,970,980 to Instant Inventor Nelson.

U.S. Pat. No. 3,970,980—issued to instant inventor Nelson on Jul. 20, 1976 in U.S. class 335 and subclass 253—teaches a rotary actuator that provides rotation of its rotor over predetermined angles. The rotor is a cylindrical housing in which are cylindrically curved permanently magnetized poles spaced apart at their ends and surrounding a fixed armature. The armature has magnetic arms angularly disposed with respect to each other, which define fixed poles. Coils wound on the fixed poles generate magnetic fields when energized to drive the rotor. A holding coil is providable to hold the rotor stationary when the holding coil is energized. The armature may have fixed poles. The actuator is operatable in rotor latching or fail-safe return modes. Fixed stop members are usable to limit angular rotation of the rotor.

(6) U.S. Pat. No. 4,227,164 to Kitahara.

U.S. Pat. No. 4,227,164—issued to Kitahara on Oct. 7, 1980 in U.S. class 335 and subclass 230—teaches a rotary solenoid or similar electromagnetic rotating apparatus that is capable of smoothly rotating in both directions.

(7) U.S. Pat. No. 4,523,167 to Remington.

U.S. Pat. No. 4,523,167—issued to Remington on Jun. 11, 1985 in U.S. class 335 and subclass 230—teaches a bistable electromagnetic latch, particularly adapted for use with an electronic combination lock on a luggage case, which includes a magnetic member pivotally mounted for rotation between a pair of pole pieces. The magnetic member has first and second stable rotational positions at which each magnetic pole is adjacent to a different pole piece. A pair of oppositely wound coils are associated with the pole pieces and responsive to the momentary flow of electrical current therethrough for producing a magnetic flux that causes the magnetic member to rotate from one position to the other.

(8) U.S. Pat. No. 5,038,064 to Fiorenza.

U.S. Pat. No. 5,038,064—issued to Fiorenza on Aug. 6, 1991 in U.S. class 310 and subclass 116—teaches a limited angle torque actuator that produces a substantially constant torque. The actuator uses a core made from a highly permeable magnetic material, such as soft iron. In a preferred embodiment, ≥1 permanent magnet is/are attached to the outer surface of the cylindrical core. In another embodiment, the permanent magnets are spaced-apart from a stationary core to create an air-gap therebetween. When current flows through a coil wound on the stator, first and second stator poles are created, which interact with the permanent magnets to rotate the rotor assembly.

(9) U.S. Pat. No. 6,518,685 to Instant Inventor Nelson.

U.S. Pat. No. 6,518,685—issued to instant inventor Nelson on Feb. 11, 2003 in U.S. class 310 and subclass 191—teaches a multi-position actuator with three electromagnetic poles where the air-gap of selected pole(s) is/are made different from the remaining pole(s). The multi-position actuator includes a housing, an armature rotatably mounted in the housing, and three poles journaled around the armature. There is also a stop arm attached to the armature, which stops the rotation of the armature when the stop arm hits an adjacent stop. The stops are positioned within the housing to limit the rotation of the armature. The multi-position actuator forms either a fail safe actuator or a latching actuator by adjusting the spacing of the air-gap between the poles and the armature. When used with continuous rotation without the stop mechanism, the air-gap(s) of the pole(s) is/are adjustable in a repetitive manner to produce a useful magnetic torque.

(10) U.S. Pat. No. 6,967,422 B2 to Instant Inventor Nelson.

U.S. Pat. No. 6,967,422 B2—issued to instant inventor Nelson on Nov. 22, 2005 in U.S. class 310 and subclass 191—teaches a two-position rotary actuator that provides a latching or holding torque that is adjustable by altering magnetic properties of a selected pole member. The actuator also functions as a sector motor over a selected range of angular motion, and provides failsafe operation that returns the actuator to a starting position when electrical power is removed.

(11) U.S. Pat. No. 8,441,159 B2 to Instant Inventor Nelson.

U.S. Pat. No. 8,441,159 B2—issued to instant inventor Nelson on May 14, 2013 in U.S. class 310 and subclass 36—teaches a self-latching sector motor for producing a net torque from two integral independent sources where one is serviceable as a spare backup or paralleled for double net torque or used alternately for extended life operation. The self-latching sector motor includes a housing, a magnet-shaft assembly, and two pair of electromagnetic poles. The magnet-shaft assembly rotates within the housing. The two pair of electromagnetic poles extend fixedly and radially inwardly from the housing, towards the magnet-shaft assembly. The electromagnetic poles of an associated pair of electromagnetic poles are diametrically and magnetically opposed to each other, and each pair of electromagnetic poles are similarly poled to each other for North and South poles so as to provide the net torque to the magnet-shaft assembly that can be backed-up or doubled. The self-latching torque at the stops is achieved by restraining the magnet-shaft assembly from seeking a position of maximum flux.

It is apparent that numerous innovations for actuators have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a latching sector motor actuator and a failsafe sector motor actuator having an available operating range not limited to 90°.

2. SUMMARY OF THE INVENTION

Thus, an object of the embodiments of the present invention is to provide a latching sector motor actuator and to provide a failsafe sector motor actuator having an available operating range not limited to 90°, which avoid the disadvantages of the prior art.

Briefly stated, another object of the embodiments of the present invention is to provide, in one embodiment, a latching sector motor actuator that includes a housing, a permanent magnet, and a pole piece. The permanent magnet rotates relative to the housing. The pole piece has a polarity and a pair of wound wire coils, is fixedly attached to the housing, and communicates with the permanent magnet to cause the permanent magnet to rotate one of clockwise and counterclockwise, depending upon the polarity of the pole piece. In another embodiment, a failsafe sector motor actuator has a pole piece with a singularly wound wire coil and further includes an auxiliary permanent magnet. The auxiliary permanent magnet is adjustably attached to the housing to extend rotation of the permanent magnet from 80° to 120°, depending upon location and magnitude of the auxiliary permanent magnet.

The novel features considered characteristic of the embodiments of the present invention are set forth in the appended claims. The embodiments of the present invention themselves, however, both as to their construction and to their method of operation together with additional objects and advantages thereof will be best understood from the following description of the embodiments of the present invention when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

A. Introductory.
10 latching sector motor actuator of embodiments of present invention
B. Configuration of Latching Sector Motor Actuator 10.
12 housing
14 permanent magnet
16 pole piece
18 arm
20 first stop
22 second stop
24 flip point between first stop 18 and second stop 22
26 armature shaft
28 toroid-shaped permanent magnet of permanent magnet 14
30 central through bore of toroid-shaped permanent magnet 28 of permanent magnet 14
32 outer periphery of toroid-shaped permanent magnet 28 of permanent magnet 14
34 single electromagnetic drive pole piece of pole piece 16
36 core of single electromagnetic drive pole piece 34 of pole piece 16
38 pair of wound wire coils of single electromagnetic drive pole piece 34 of pole piece 16
40 soft iron core of core 36 of single electromagnetic drive pole piece 34 of pole piece 16
C. Configuration of Failsafe Sector Motor Actuator 110.
110 failsafe sector motor actuator of embodiments of present invention
112 housing
114 permanent magnet
116 pole piece
117 auxiliary permanent magnet
118 arm
120 first stop
122 second stop
126 armature shaft
128 toroid-shaped permanent magnet of permanent magnet 114
130 central through bore of toroid-shaped permanent magnet 128 of permanent magnet 114
132 outer periphery of toroid-shaped permanent magnet 128 of permanent magnet 114
134 electromagnetic drive pole piece of pole piece 116
136 core of electromagnetic drive pole piece 134 of pole piece 116
138 singularly wound wire coil of electromagnetic drive pole piece 134 of pole piece 116
140 soft iron core of core 136 of electromagnetic drive pole piece 134 of pole piece 116

5. DETAILED DESCRIPTION OF THE PREFERRED EMBODIMENTS

A. Introductory.
Referring now to the figures, in which like numerals indicate like parts, and particularly to FIGS. 1 and 2, the latching sector motor actuator of the embodiments of the present invention is shown generally at 10.

B. The Configuration of the Latching Sector Motor Actuator 10.

Figure 1:
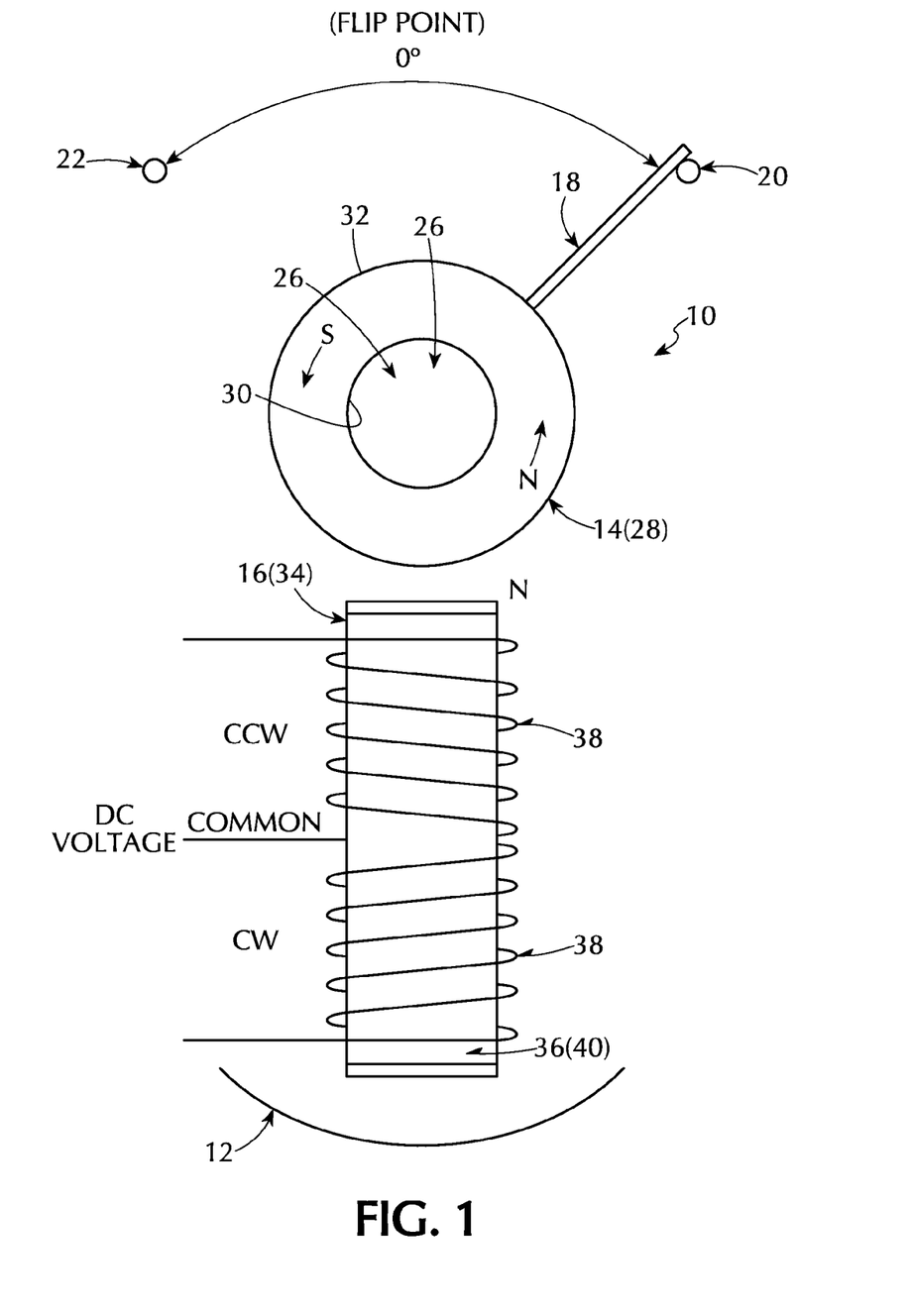
FIG. 1 is a diagrammatic view of the latching sector motor actuator of the embodiments of the present invention.

As shown in FIG. 1, the latching sector motor actuator 10 comprises a housing 12, a permanent magnet 14, and a pole piece 16. The permanent magnet 14 rotates relative to the housing 12. The pole piece 16 has a polarity, is fixedly attached to the housing 12, and magnetically communicates with the permanent magnet 14 to cause the permanent magnet 14 to rotate one of clockwise and counterclockwise, depending upon the polarity of the pole piece 16.

The latching sector motor actuator 10 further comprises an arm 18. The arm 18 extends radially from the permanent magnet 14, and rotates therewith.

The latching sector motor actuator 10 further comprises a first stop 20 and a second stop 22. The first stop 20 and the second stop 22 are fixedly attached to the housing 12, and limit rotation of the permanent magnet 14 by being engaged by the arm 18.

Figure 2:
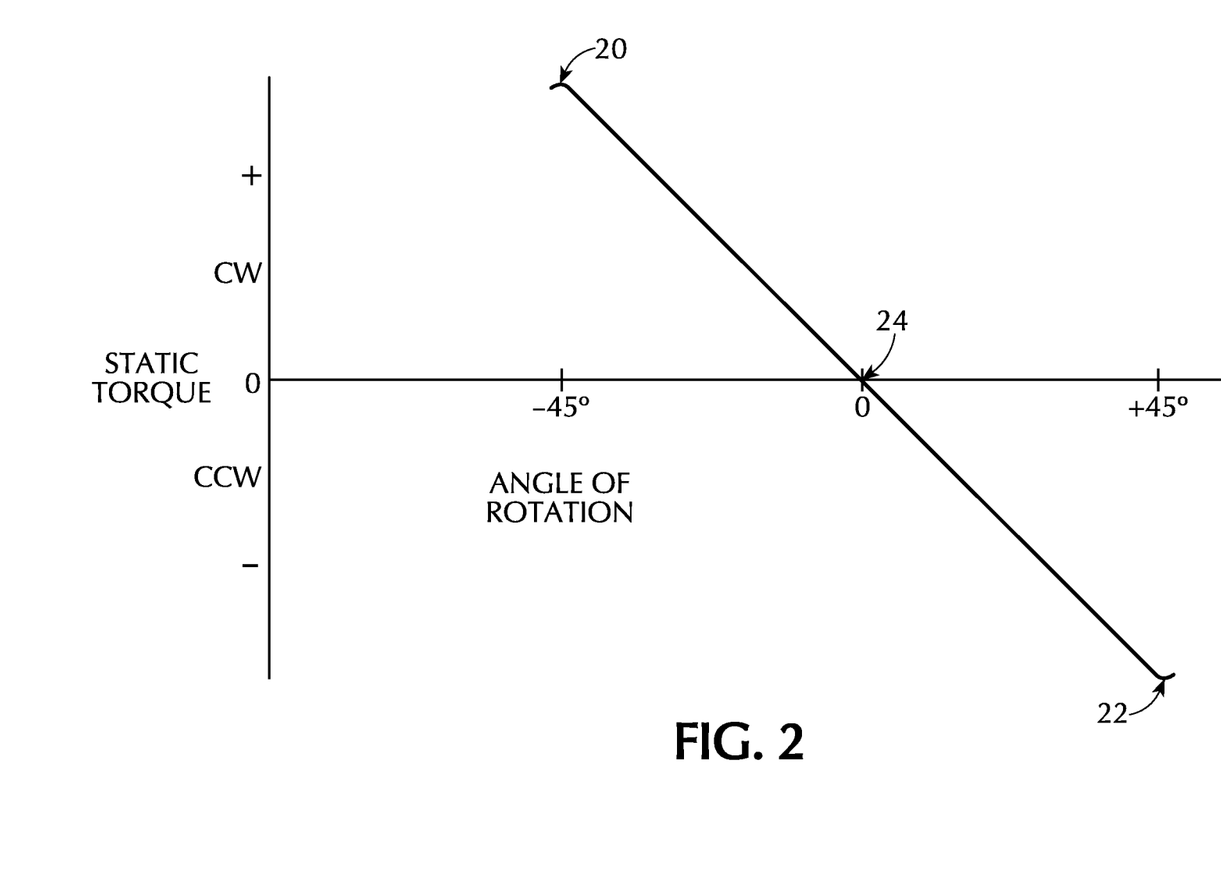
FIG. 2 is a diagrammatic static torque plot of the latching sector motor actuator of the embodiments of the present invention shown in FIG. 1 and not energized.

As shown in FIG. 2, the latching sector motor actuator 10 has an inherent (magnetic) clockwise static holding torque at the first stop 20, an inherent (magnetic) counterclockwise static holding torque at the second stop 22, and a flip point 24 located equidistantly between the first stop 20 and the second stop 22, all when not energized.

The inherent (magnetic) clockwise static holding torque at the first stop 20 and the inherent (magnetic) counterclockwise static holding torque at the second stop 22 are produced by the permanent magnet 14 seeking a maximum flux.

Returning back to FIG. 1, the latching sector motor actuator 10 further comprises an armature shaft 26. The armature shaft 26 is support by bearings in the housing 12.

The permanent magnet 14 is a toroid-shaped permanent magnet 28, and thereby has a central through bore 30 and an outer periphery 32.

The armature shaft 26 passes through the central through bore 30 of the toroid-shaped permanent magnet 28 of the permanent magnet 14.

The arm 18 is affixed to the armature shaft 26, and rotates therewith.

The toroid-shaped permanent magnet 28 of the permanent magnet 14 is radially magnetized, is journaled to rotate by the armature 26, and, for example, has a rotating operating range of 90° between the first stop 20 and the second stop 22.

The pole piece 16 is a single electromagnetic drive pole piece 34.

The single electromagnetic drive pole piece 34 of the pole piece 16 has a core 36 and a pair of wound wire coils 38. The pair of wound wire coils 38 of the single electromagnetic drive pole piece 34 of the pole piece 16 are wrapped around the core 36 of the single electromagnetic drive pole piece 34 of the pole piece 16 in opposite directions so when individually energized produces a suitable pole to produce one of clockwise motion and counterclockwise motion.

The core 36 of the single electromagnetic drive pole piece 34 of the pole piece 16 is a soft iron core 40.

Figure 3A:
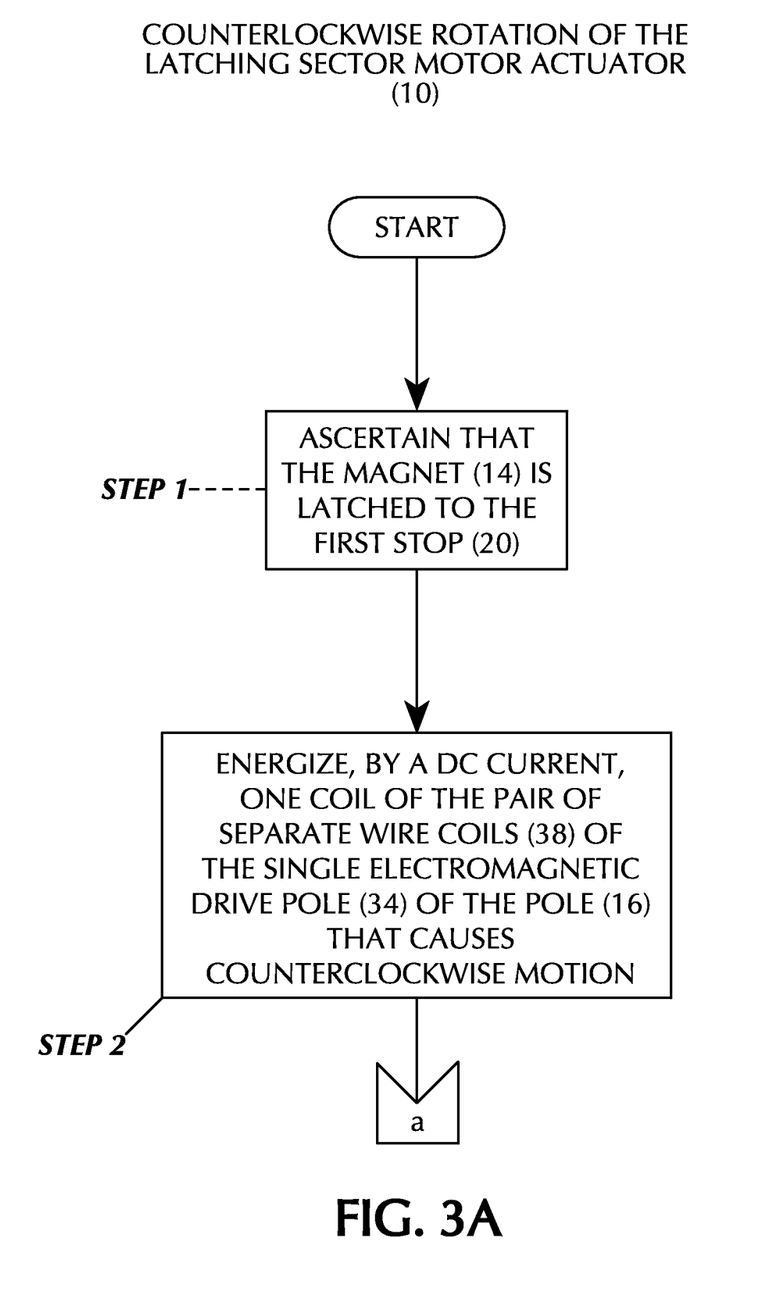
FIG. 3A-3B is a flowchart of counterclockwise rotation of the latching sector motor actuator of the embodiments of the present invention shown in FIG. 1.
Figure 3B:
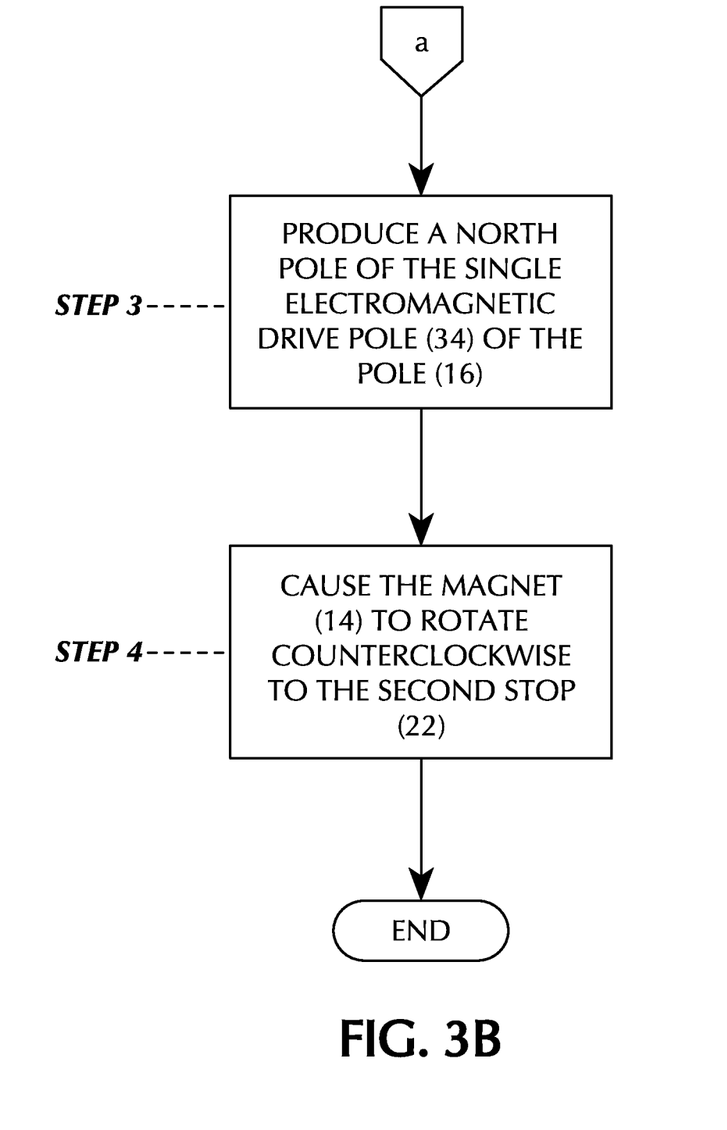

As shown in FIGS. 3A-3B, when the permanent magnet 14 is latched to the first stop 20 by static latching torque, and one wire coil of the pair of wound wire coils 38 of the single electromagnetic drive pole piece 34 of the pole piece 16 that causes counterclockwise motion is energized by a dc current, counterclockwise rotation of the permanent magnet 14 to the second stop 22 is achieved by the single electromagnetic drive pole piece 34 of the pole piece 16 producing a North pole and overcoming static latching torque of the permanent magnet 14 at the first stop 20.

When the permanent magnet 14 is latched to the second stop 22, and the other wire coil of the pair of wound wire coils 38 of the single electromagnetic drive pole piece 34 of the pole piece 16 that causes clockwise motion is energized by a dc current, clockwise rotation of the permanent magnet 14 to the first top 20 is achieved by the single electromagnetic drive pole piece 34 of the pole piece 16 producing a South pole.

The pair of wound wire coils 38 of the single electromagnetic drive pole piece 34 of the pole piece 16 could be wound as a singularly wound wire coil so to be wound in the same direction so as to allow polarity of the pole piece 16 to be determined by polarity of the dc current.

The toroid-shaped permanent magnet 28 of the permanent magnet 14 is made from a material selected from the group consisting of ceramic, rare earth, and alnico[1].

[1] An alloy used to make high-energy permanent magnets, which contains aluminum, iron, nickel, and either cobalt, copper, or titanium.

C. The Configuration of the Failsafe Sector Motor Actuator 110.

Figure 4:
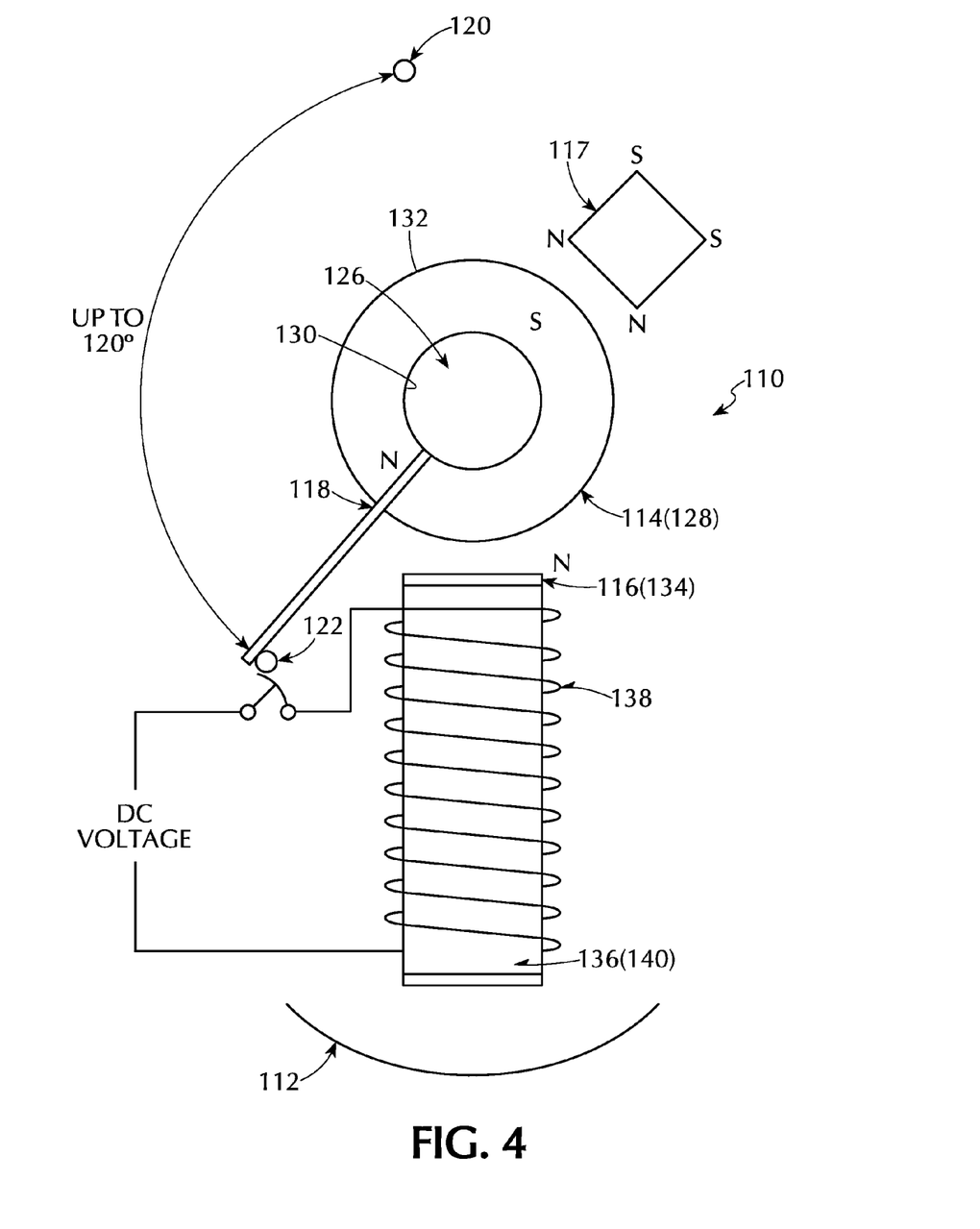
FIG. 4 is a diagrammatic view of the failsafe sector motor actuator of the embodiments of the present invention in the de-energized mode.
Figure 5:
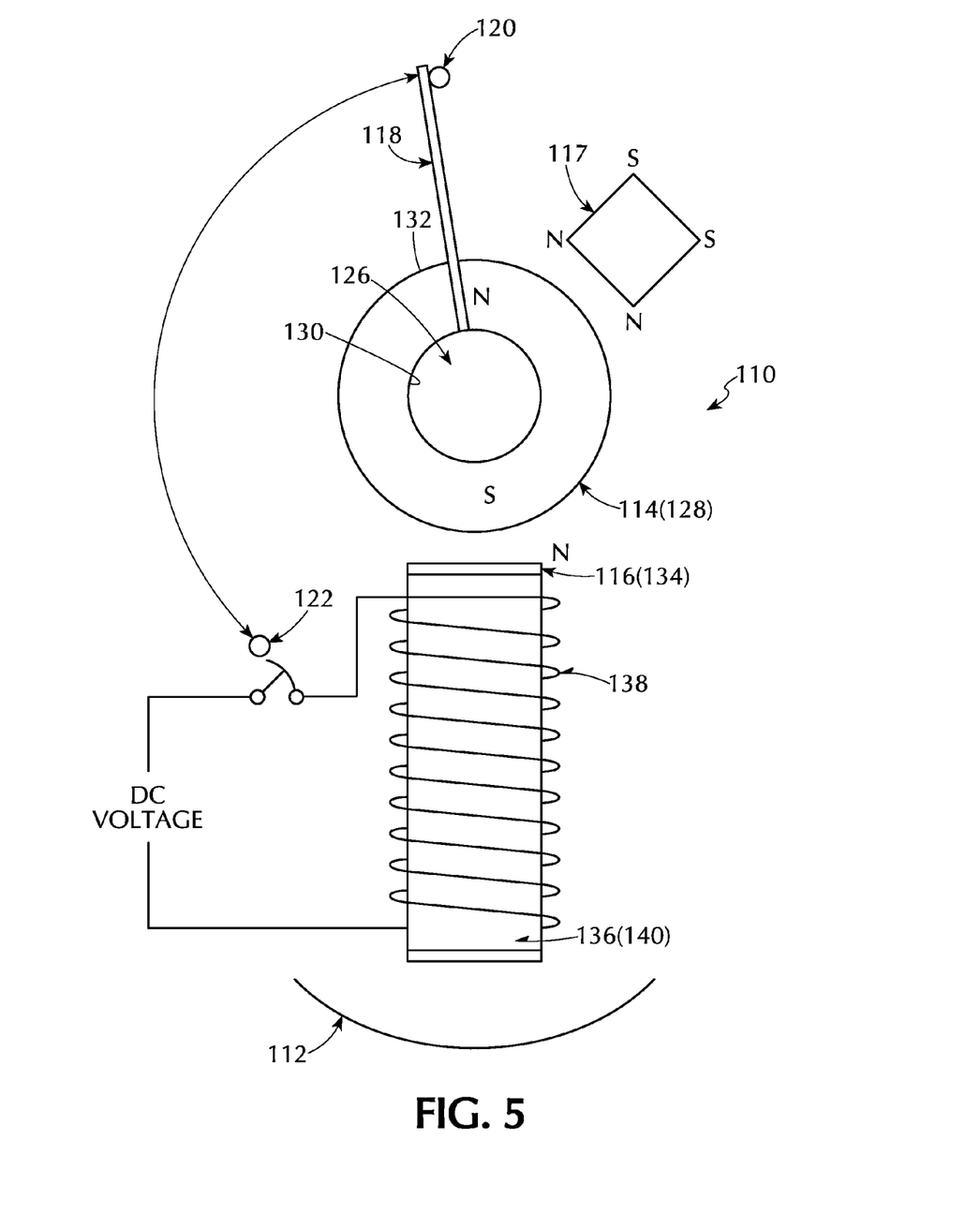
FIG. 5 is a diagrammatic view of the failsafe sector motor actuator of the embodiments of the present invention in the energized mode.

Referring now to FIGS. 4 and 5, the failsafe sector motor actuator of the embodiments of the present invention is shown generally at 110, which has an available operating range not limited to 90°.

The failsafe sector motor actuator 110 comprises a housing 112, a permanent magnet 114, a pole piece 116, and an auxiliary permanent magnet 117. The permanent magnet 114 rotates relative to the housing 112. The pole piece 116 is fixedly attached to the housing 112, and magnetically repels the permanent magnet 114 to cause the permanent magnet 114 to rotate when the pole piece 116 is energized.

The auxiliary permanent magnet 117 is adjustably attached to the housing 112 to extend rotation of the permanent magnet 114 to 120°, depending upon location and magnitude of the auxiliary permanent magnet 114, yet the failsafe sector motor actuator 110 still functions for lesser ranges.

The failsafe sector motor actuator 110 further comprises an arm 118. The arm 118 extends radially from the armature shaft 126, and rotates therewith.

The failsafe sector motor actuator 110 further comprises a first stop 120 and a second stop 122. The first stop 120 and the second stop 122 are fixedly attached to the housing 112, and limit rotation of the permanent magnet 114 by being engaged by the arm 118.

When the pole piece 116 is de-energized, the permanent magnet 114 returns to the second stop 122 due to an attraction of a North pole of the permanent magnet 114 to the pole piece 116 and repulsion of the auxiliary permanent magnet 117.

The failsafe sector motor actuator 110 further comprises an armature shaft 126. The armature 126 is support by bearings in the housing 112.

The permanent magnet 114 is a toroid-shaped permanent magnet 128, and thereby has a central through bore 130 and an outer periphery 132.

The armature shaft 126 passes through the central through bore 130 of the toroid-shaped permanent magnet 128 of the permanent magnet 114, and supports the toroid-shaped permanent magnet 128 of the permanent magnet 114.

The arm 118 is affixed to the outer periphery 132 of the armature shaft 126, and rotates therewith.

The toroid-shaped permanent magnet 128 of the permanent magnet 114 is radially magnetized, is journaled to rotate by the armature 126, and, for example, has a rotating operating range of 90° between the first stop 120 and the second stop 122, but in combination with the auxiliary permanent magnet 117 has a rotating operating range of 120°.

The pole piece 116 is an electromagnetic drive pole piece 134.

The electromagnetic drive pole piece 134 of the pole piece 116 has a core 136 and a singularly wound wire coil 138. The singularly wound wire coil 138 of the electromagnetic drive pole piece 134 of the pole piece 116 is wrapped around the core 136 of the electromagnetic drive pole piece 134 of the pole piece 116.

The core 136 of the electromagnetic drive pole piece 134 of the pole piece 116 is a soft iron core 140.

The toroid-shaped permanent magnet 128 of the permanent magnet 114 is made from a material selected from the group consisting of ceramic, rare earth, and alnico.

Figure 6A:
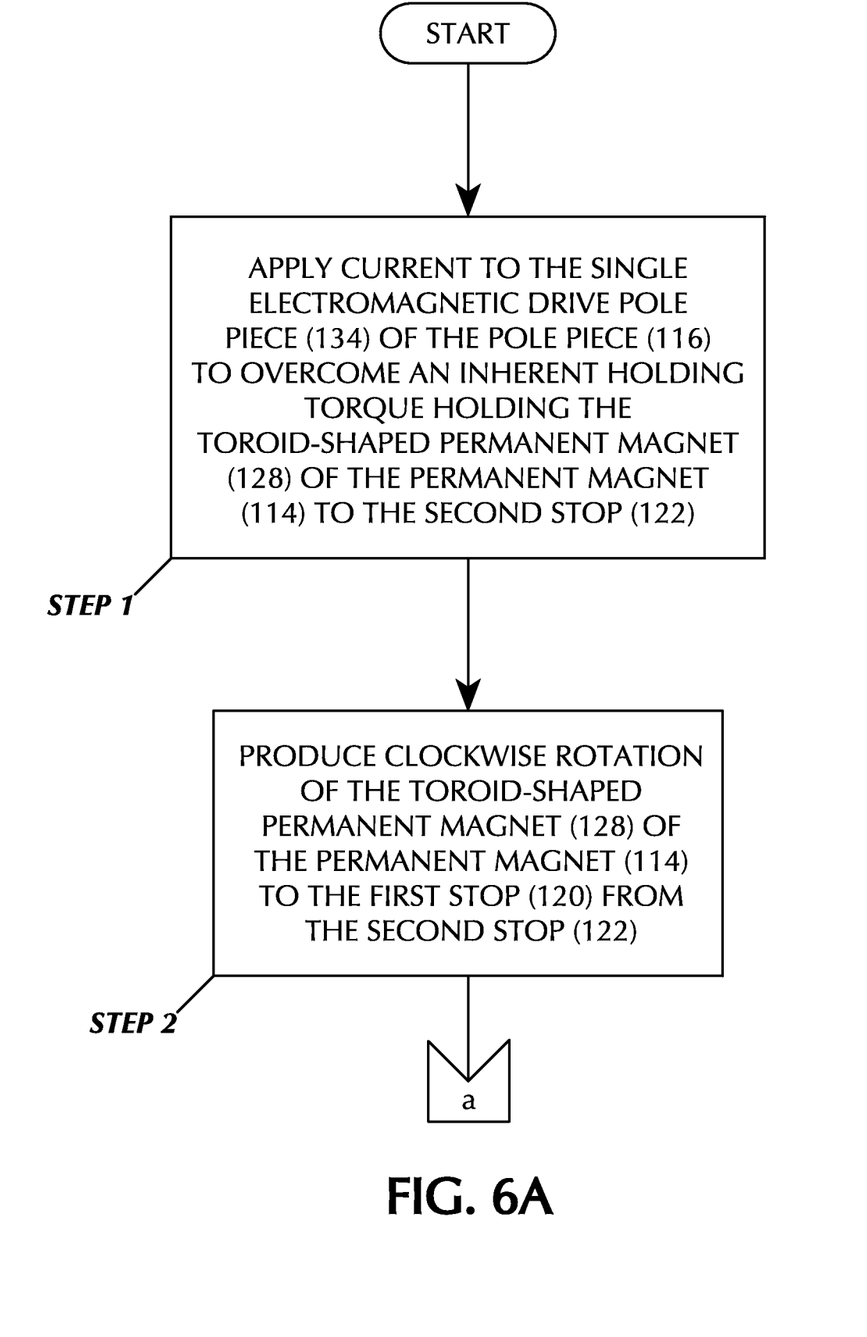
FIGS. 6A-6B is a flowchart of rotation of the failsafe sector motor actuator of the embodiments of the present invention shown in FIGS. 4 and 5.
Figure 6B:
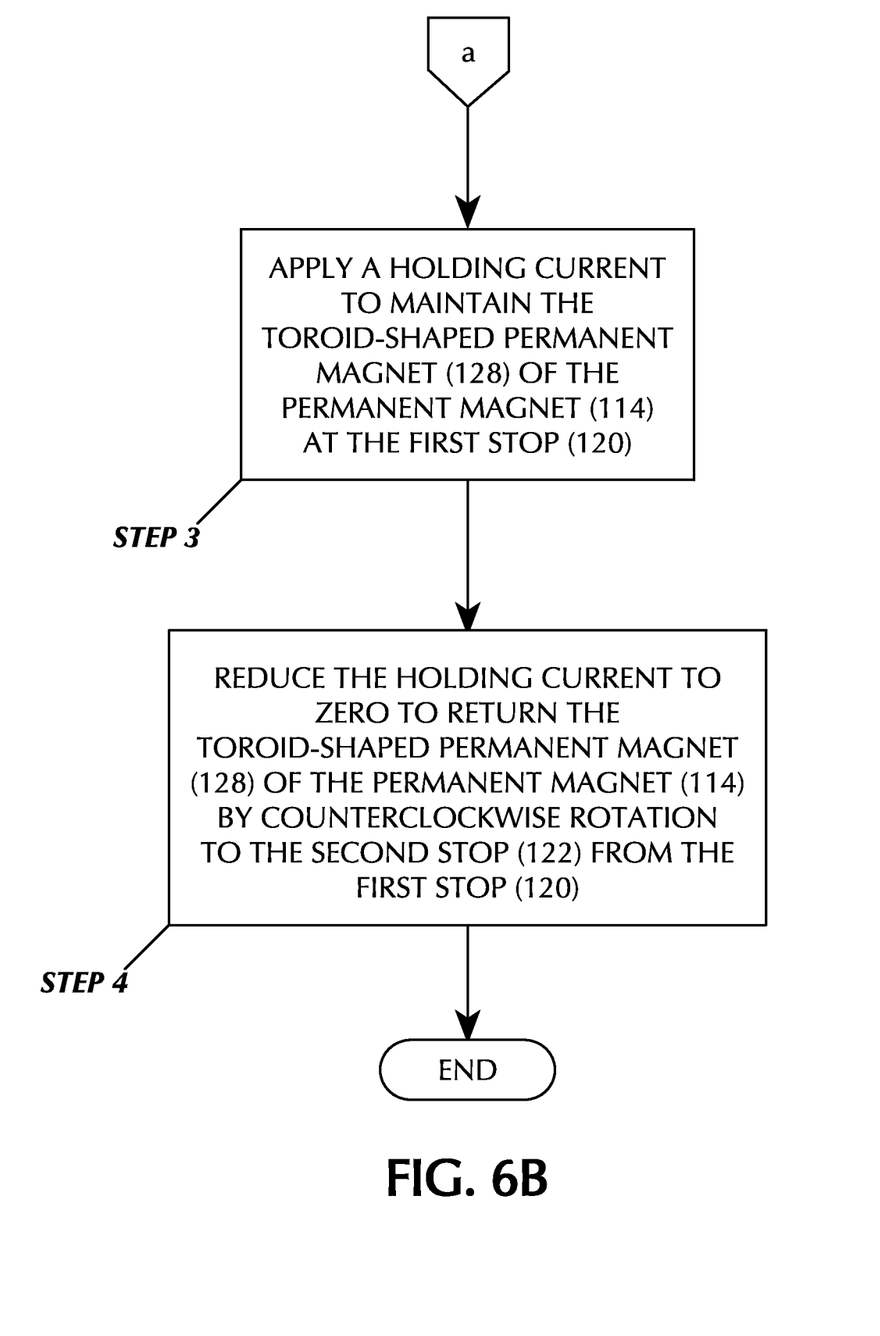

As shown in FIGS. 6A-6B, to actuate the failsafe sector motor actuator 110, dc current is applied to the electromagnetic drive pole piece 134 of the pole piece 116 to overcome an inherent holding torque holding the toroid-shaped permanent magnet 128 of the permanent magnet 114 to the second stop 122 to thereby produce clockwise rotation of the toroid-shaped permanent magnet 128 of the permanent magnet 114 to the first stop 120 from the second stop 122. A holding current is required to maintain the toroid-shaped permanent magnet 128 of the permanent magnet 114 at the first stop 120. To return the toroid-shaped permanent magnet 128 of the permanent magnet 114 to the second stop 122 from the first stop 120, the holding current is reduced to zero and the toroid-shaped permanent magnet 128 of the permanent magnet 114 inherently returns by counterclockwise rotation to the second stop 122 from the first stop 120.

D. The Impressions.

It will be understood that each of the elements described above or two or more together may also find a useful application in other types of constructions differing from the types described above.

While the embodiments of the present invention have been illustrated and described as embodied in a latching sector motor actuator and in a failsafe sector motor actuator, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A failsafe sector motor actuator having an available operating range not limited to 90°, comprising:
   a) a housing;
   b) a permanent magnet;
   c) a pole piece;
   d) an auxiliary permanent magnet; and
   e) an armature shaft;
   wherein said permanent magnet supported by said armature shaft rotates relative to said housing;
   wherein said pole piece is fixedly attached to said housing;

wherein said pole piece magnetically repels said permanent magnet to cause said permanent magnet to rotate when said pole piece is energized;

wherein said auxiliary permanent magnet is adjustably attached to said housing to extend rotation of said permanent magnet from 90° to 120°, depending upon location and magnitude of said auxiliary permanent magnet; and wherein said permanent magnet is a toroid-shaped permanent magnet.

2. The failsafe sector motor actuator of claim 1, further comprising an arm;

wherein said arm extends radially from said armature shaft; and wherein said arm rotates with said permanent magnet.

3. The failsafe sector motor actuator of claim 2, further comprising:

a) a first stop; and
b) a second stop;

wherein said first stop and said second stop are fixedly attached to said housing; and wherein said first stop and said second stop limit rotation of said permanent magnet by being engaged by said arm.

4. The failsafe sector motor actuator of claim 3, wherein said permanent magnet returns to said second stop from said first stop due to an attraction of a North pole of said permanent magnet to said pole piece and a repulsion of said auxiliary permanent magnet when said pole piece is de-energized.

5. The failsafe sector motor actuator of claim 2, further comprising an armature;

wherein said armature is attached to said housing.

6. The failsafe sector motor actuator of claim 5, wherein said toroid-shaped permanent magnet of said permanent magnet has:

a) a central through bore; and
b) an outer periphery.

7. The failsafe sector motor actuator of claim 6, wherein said armature passes through said central through bore of said toroid-shaped permanent magnet of said permanent magnet.

8. The failsafe sector motor actuator of claim 6, wherein said arm is affixed to said armature shaft supporting said permanent magnet; and wherein said arm rotates with said outer periphery of said toroid-shaped permanent magnet of said permanent magnet.

9. The failsafe sector motor actuator of claim 6, wherein said toroid-shaped permanent magnet of said permanent magnet is radially magnetized; and wherein said toroid-shaped permanent magnet of said permanent magnet is journaled to rotate by said armature.

10. The failsafe sector motor actuator of claim 3, wherein said toroid-shaped permanent magnet of said permanent magnet has a rotating operating range to 90° between said first stop and said second stop, but in combination with said auxiliary permanent magnet has a rotating operating range to 120°.

11. The failsafe sector motor actuator of claim 1, wherein said pole piece is an electromagnetic drive pole piece.

12. The failsafe sector motor actuator of claim 11, wherein said electromagnetic drive pole piece of said pole piece has:

a) a core; and
b) a singularly wound wire coil; and wherein said singularly wound wire coil of said electromagnetic drive pole piece of said pole piece is wrapped around said core of said electromagnetic drive pole piece of said pole piece.

13. The failsafe sector motor actuator of claim 12, wherein said core of said single electromagnetic drive pole piece of said pole piece is a soft iron core.

14. The failsafe sector motor actuator of claim 6, wherein said toroid-shaped permanent magnet of said permanent magnet is made from a material selected from the group consisting of ceramic, rare earth, and alnico.

\* \* \* \* \*